United States Patent [19]
Clark

[11] 3,723,009
[45] Mar. 27, 1973

[54] DIRECT READING ABERRATION-FREE COMPENSATOR WITH ADJUSTABLE SENSITIVITY FOR USE IN WHITE LIGHT INTERFEROMETRY

[76] Inventor: John B. Clark, 3203 Runkle St., Niles, Mich. 49120

[22] Filed: July 19, 1971

[21] Appl. No.: 163,862

Related U.S. Application Data

[63] Continuation-in-part of Ser. No. 109,167, Jan. 25, 1971.

[52] U.S. Cl. ................................................. 356/107
[51] Int. Cl. ............................................... G01b 9/02
[58] Field of Search ........................... 356/106–113

[56] References Cited

UNITED STATES PATENTS 3,035,482   5/1962   Kinder ................................ 356/107

OTHER PUBLICATIONS

Modern Interferometer; Candler; Hilger & Watts Ltd; 1951, pp. 481–482.

*Primary Examiner*—Ronald L. Wibert
*Assistant Examiner*—Conrad Clark
*Attorney*—E. Manning Giles et al.

[57] ABSTRACT

An aberration-free compensator for use in white light interferometry is provided in which anomalous fringe shifts characteristic of the difference in refractive dispersion between the two limbs of the interferometer are eliminated. The compensator is designed so that the sole difference in light paths through the compensator elements in the two limbs of the interferometer is through fluid media having refractive dispersions which are substantially identical to that of the material being studied in the interferometer. Use of such a fluid medium compensator permits changing the refractive dispersion thereof without substantially rebuilding the interferometer.

5 Claims, 5 Drawing Figures

PATENTED MAR 27 1973 3,723,009

INVENTOR
JOHN B. CLARK
BY *Michael A. Kondzella*
ATTORNEY

DIRECT READING ABERRATION-FREE COMPENSATOR WITH ADJUSTABLE SENSITIVITY FOR USE IN WHITE LIGHT INTERFEROMETRY

BACKGROUND OF THE INVENTION

This application is a continuation-in-part of application Ser. No. 109,167, filed Jan. 25, 1971.

This invention relates to an improved compensator for used in white light interferometry. In one of its more particular aspects this invention relates to a compensator in which the problem of anomalous fringe shifts is eliminated instrumentally.

The art of interferometry provides techniques to determine differences between refractive indices or thicknesses of fluids and transparent solids by measuring the difference in the path length of light between the two limbs of an interferometer, one limb containing the unknown, that is, the material upon which the determination is to be conducted and the other limb containing a reference material, the refractive index or thickness of which is known.

In the Rayleigh interferometer, for example, shown in a schematic plan view in FIG. 1, white light from a source 10 is passed through a narrow vertical slit 11, collimated by a lens 12 and passed in parallel beams through two vertical slits 13 and 14 which divide the light beam into two beams, one of which passes through a cell 15 containing a reference material, the other passing through a cell 16 containing the unknown. The emergent beams from the reference and unknown cells are then passed through compensators 17 and 18, respectively, recombined by passing through collimating lens 19 and focused upon ocular cylinder lens 20 forming interference fringes upon recombination. These interference fringes can be viewed directly by means of the cylindrical ocular lens or in the focal plane of a telescope (not shown) or in the focal plane of a camera (not shown) depending upon the particular use to which the measurement is to be put. In conducting a measurement with the Rayleigh interferometer it has been customary to use a compensator for equalizing the light paths in the two limbs of the interferometer. One convenient method for accomplishing this result has been to align the interference fringes with respect to a null fringe pattern which is produced by a portion of the light beam which does not pass through those portions of the cells which contain the materials being studied but instead passes through identical paths in both limbs. Upon placing the same material in both the reference and unknown cell and aligning the interference fringes thereby produced with respect to the null fringe pattern by appropriate movement of the compensator a zero setting of the compensator is obtained as shown in FIG. 2, the lower set of fringes representing the null fringe pattern. FIG. 3 shows a typical fringe pattern (upper pattern) displaced from the null fringe pattern (lower pattern). Realignment of the fringes upon introduction of an unknown material into the unknown cell thereafter requires a certain movement of the compensator which can be measured. By appropriate calibration of the compensator the refractive index, thickness or concentration of the unknown can be read directly.

Other interferometers such as the Jamin, the Twyman-Green, the Williams, the Michelson and the Mach Zehnder interferometers generally operate upon the same principles.

Compensators in general have taken various forms including tiltable glass plates or sliding glass wedge elements which can be used to vary the path length of the light beam through the limb of the interferometer in which the movable element is located. In each case a similar fixed glass plate is placed in the other limb of the interferometer.

However, use of any of the known compensators may result in a chromatic aberration in the resulting fringe pattern if the refractive dispersion of the compensator does not match that of the material being studied. The refractive dispersion is the dependence of refractive index upon wave-length. This aberration makes alignment of the fringe pattern with the null fringe pattern difficult because of the uncertainty in identifying and locating the "zero order" fringe due to anomalous shifting of this fringe. This observed anomalous fringe shift is characteristic of the difference in refractive dispersion between the two limbs of the interferometer which manifests itself as a discontinuity in compensator travel necessary to rematch the null pattern with respect to path-length difference. These observed discontinuities are shown for solutions of lithium bromide and sucrose in FIG. 4 wherein compensator travel is plotted as micrometer drum reading and path-length difference is plotted as percent of solute. Each point of discontinuity causes a serious uncertainty in the identification of the "zero order" fringe. In a technique where differences on the order of a thousandth of a fringe can otherwise accurately be measured this defect has prevented the full realization of the potential of interferometry as a measuring means.

SUMMARY OF THE INVENTION

In accordance with the present invention an aberration-free compensator for use in white light interferometry which eliminates the observed discontinuities described above is provided. This compensator balances the path lengths of the two limbs of the interferometer in such a way as to make the "zero order" fringe easily and accurately identifiable.

In the prior art it has been suggested that a collection of compensator plates having various refractive dispersions matched to the dispersion of the material being studied could be used for this purpose. L. H. Adams, J. Am. Chem. Soc. 37, 1181 (1915); L. H. Adams, J. Wash. Acad. 5, 276 (1915). However, implementation of this suggestion would require the availability of an impractically large number of different yet optically matched pairs of plates of high optical perfection and would entail almost endless disassembly, reassembly, realignment and calibration of the interferometer involved.

The improved compensator of this invention accomplishes the desired result by in effect utilizing as compensator plates variable thicknesses of two fluid media, the refractive dispersions of which are substantially identical to that of the material being studied in the interferometer and the refractive indices of which are different from each other. Such fluid media may be two solutions, the refractive dispersion of one of which is the same as that of the reference or unknown material or within the range between that of the reference material and unknown material, and the refractive dispersion of the other is nearly the same. The refractive dispersion of both solutions may fall within the range between that of the reference material and unknown material if desired. One convenient way of accomplishing the desired result is to use the reference material itself as one of the solutions and a material having a refractive index different from the refractive index of the reference material as the other solution.

Utilization of the improved compensator of this invention thus permits realization of the long recognized advantages of white light interferometry in differential refractometry which heretofore could not be realized because of the difficulty and uncertainty in identifying the "zero order" fringe.

Various features of the invention will be illustrated and explained in the following description of the drawing and the description of the preferred embodiments.

DESCRIPTION OF THE PREFERRED EMBODIMENTS

Figure 1:
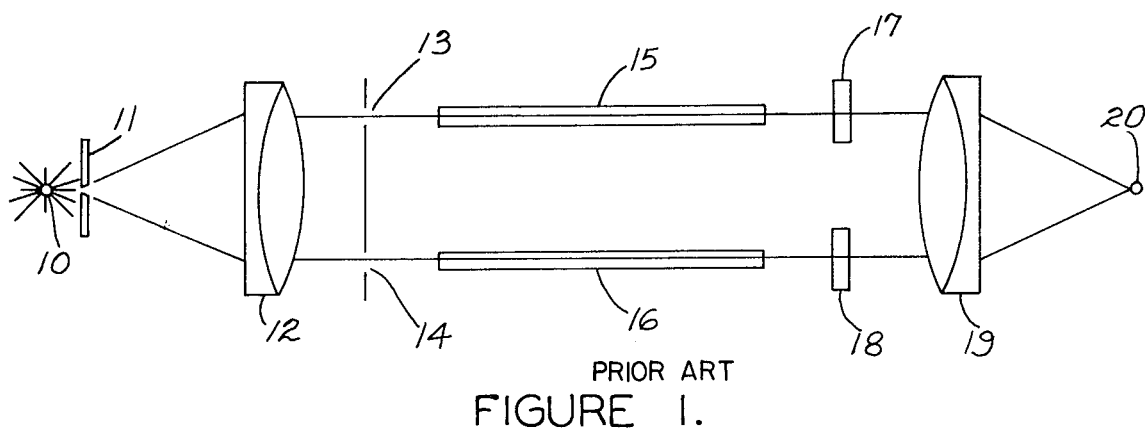
FIG. 1, described above, is a schematic plan view of a Rayleigh interferometer.
Figure 2:
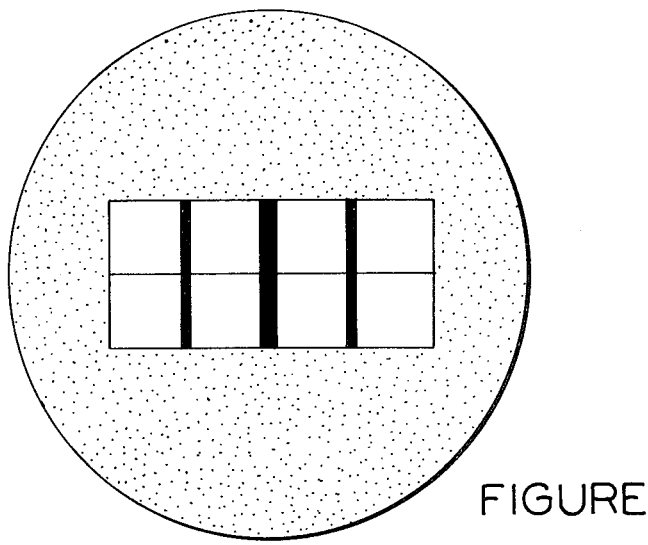
FIG. 2, described above, is a diagrammatic view of a typical fringe pattern (upper pattern) aligned with a null fringe pattern (lower pattern)
Figure 3:
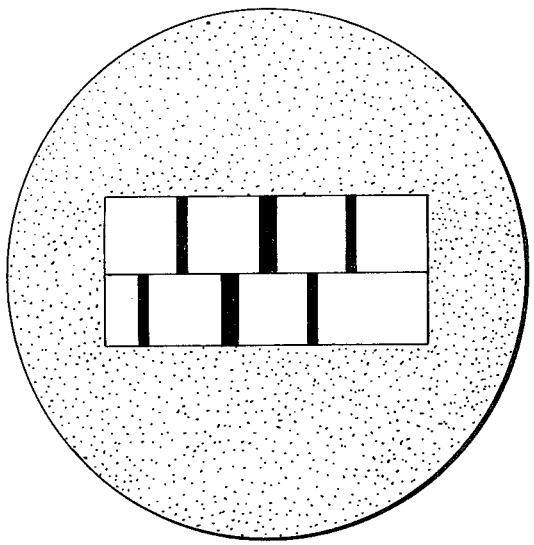
FIG. 3, described above, is a diagrammatic view of a typical fringe pattern (upper pattern) displaced from a null fringe pattern (lower pattern)
Figure 4:
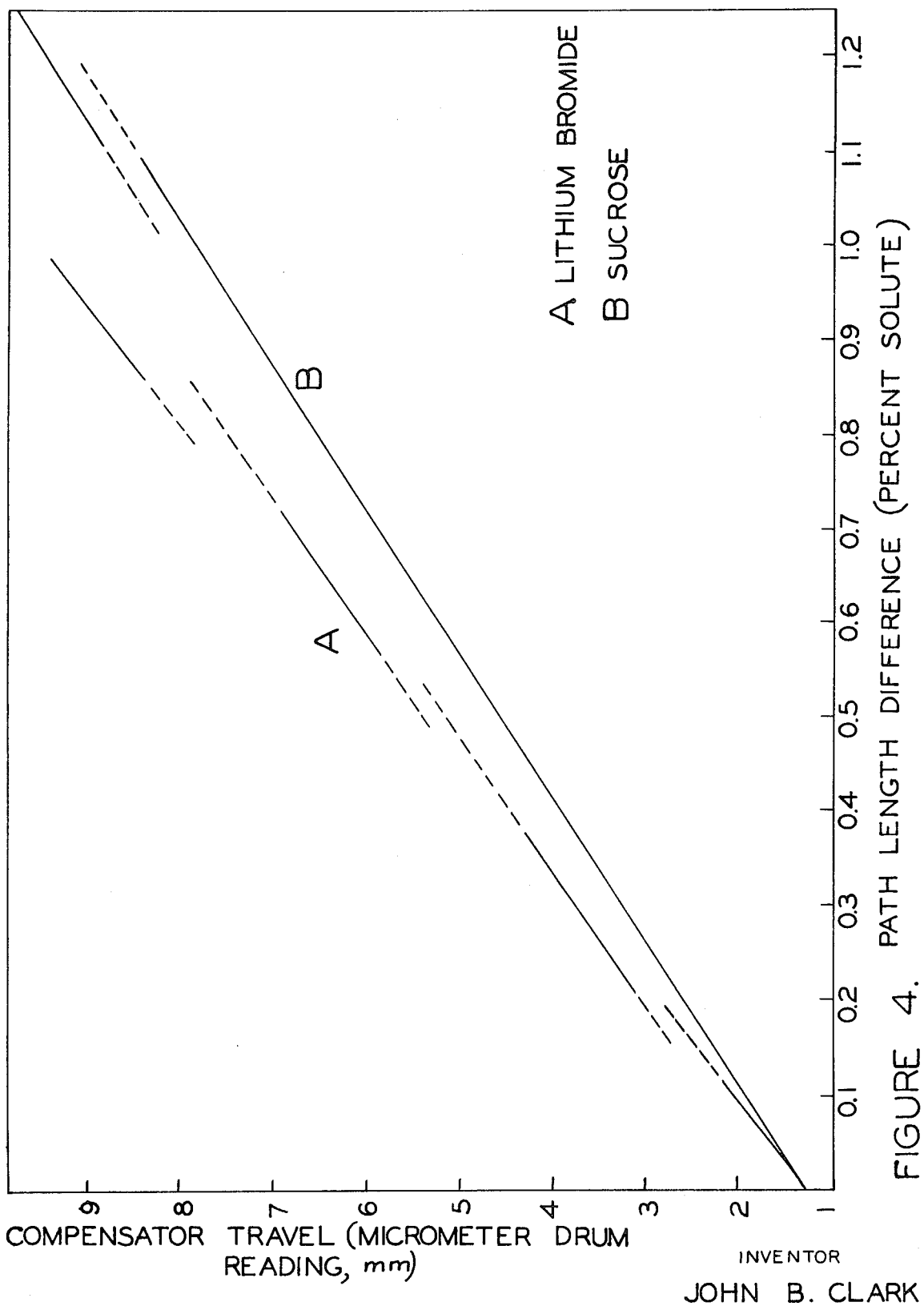
FIG. 4, described above, is a graph showing compensator travel plotted against path length difference.
Figure 5:
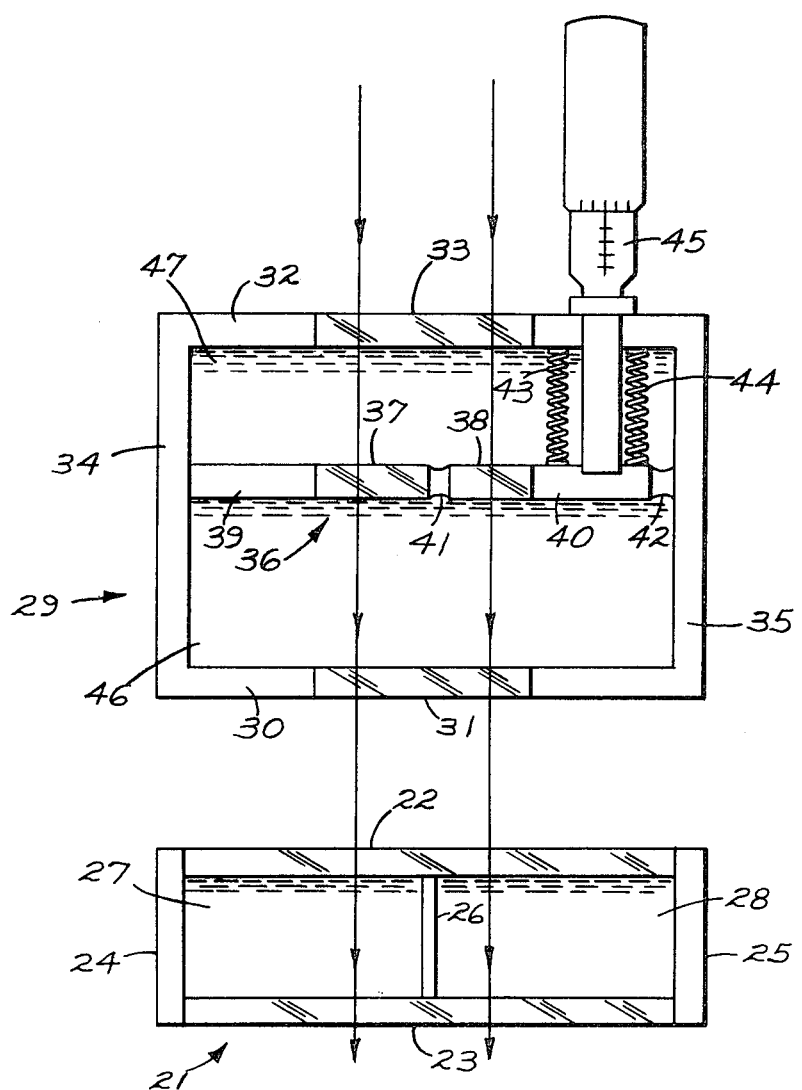
FIG. 5 is a plan view of one embodiment of the present invention.

Referring to FIG. 5 a compartmented compensator is shown in which the light path through one limb of the interferometer can be varied with respect to the light path through the other limb by varying the ratio of the length of light path through one compartment of the compensator to the length of light path through the other compartment in one limb of the interferometer with respect to the ratio in the other limb.

Measurement cell 21 having transparent windows 22 and 23, side walls 24 and 25, barrier 26, and top and bottom, not shown, contains unknown material 27 and reference material 28. Mixing of unknown material 27 and reference material 28 is prevented by means of barrier 26 which is impermeable to the materials being studied in the interferometer. If desired completely separate cells can be used for the unknown material and the reference material.

Compensator 29 comprises front wall 30 containing transparent window 31, rear wall 32 containing transparent window 33, side walls 34 and 35, divider 36 and top and bottom, not shown. Divider 36 contains transparent windows 37 and 38, left and right divider segments 39 and 40, and flexible seals 41 and 42. Positioned between the right hand portion of rear wall 32 and right divider segment 40 are springs 43 and 44. Right divider segment 40 is attached to micrometer 45 which is mounted within the right hand portion of rear wall 32.

Solutions 46 and 47 contained within the front and rear compartments, respectively, of compensator 29, have refractive dispersions which are substantially identical to those of the reference and unknown materials. The refractive index of solution 46 is different from the refractive index of solution 47. For example if the unknown material 27 is a sodium bromide solution having a concentration between 1 and 2 percent by weight, then the reference material 28 may be a 1 percent sodium bromide solution and the solutions 46 and 47 can be 2 and 1 percent solutions of sodium bromide, respectively.

Clockwise movement of the barrel of micrometer 45 causes right divider segment 40 to move against the restraining force of springs 43 and 44 to the extent allowed by flexible seals 41 and 42. This movement of right divider segment 40 causes lengthening of the light path through the rear compartment of compensator 29 and an equal shortening of the light path through the front compartment in the right limb of the interferometer. No change takes place in the light path through the front and rear compartments in the left limb of the interferometer.

Thus by movement of the micrometer the ratio of the length of light path through the rear compartment to the length of light path through the front compartment in the right limb of the interferometer may be varied with respect to the ratio of the length of the light paths through the corresponding two compartments in left limb and the interference fringes can be aligned with the null fringe pattern as previously explained.

One advantage of using the compensator system of this invention is that the sensitivity of the compensator is largely dependent upon the difference in refractive index of the two compensator solutions rather than the sensitivity of measurement of travel of the compensator and such sensitivity can be varied to meet the requirements of a particular measurement.

If $n_1$ is the refractive index of the reference material 28 and the refractive index of the compensator solution 47, the light path of which, $D_1$, is being lengthened in the right limb by an amount $\Delta D$, $n_2$ is the refractive index of the unknown material 27, $n_3$ is the refractive index of the compensator solution 46, the light path of which, $D_3$, is being shortened in the right limb by the same amount $\Delta D$, and $l_{cell}$ is the light path through the measurement cell 21, the equation for the optical paths through the two limbs at null alignment is:

$$n_1 D_1 + n_3 D_3 + n_2 l_{cell} =$$
$$n_1 (D_1 + \Delta D) + n_3 (D_3 - \Delta D) + n_1 l_{cell}.$$

Simplifying, the following equation is obtained:

$$l_{cell} (n_2 - n_1) = \Delta D (n_1 - n_3).$$

Since, in the interferometer $$N\lambda = l_{cell} (n_2 - n_1),$$

$$N\lambda = \Delta D (n_1 - n_3).$$

For one fringe:

$\lambda = \Delta D (n_1 - n_3)$. Therefore:

$$\Delta D = (\lambda/n_1 - n_3)$$

That is, the distance the right divider segment 40 must move corresponding to one wave length of compensated path difference depends upon the difference between the refractive indices of the two compensator solutions 46 and 47 and can be made sufficiently large to accommodate the precision of any micrometer or other mechanical traveling device by making the difference in refractive index sufficiently small.

Although the mathematical development has been arrived at by assuming that the refractive index of one of the compensator solutions is identical to the refractive index of the reference material in the interferometer cell, a similar result will be obtained if the refractive index of neither of the compensator solutions is identical to that of the reference material so long as the refractive disperions are substantially identical.

Another advantage of this invention is that the compensator is direct reading with respect to concentration differences $\Delta c$ providing the refractive increment of the material in the cell and compensator are substantially identical. This can be shown mathematically as follows:

At null:

$$l_{cell}(n_2 - n_1) = \Delta D (n_1 - n_3).$$

Since:

$$\Delta n = (dn/dc)_{\bar{c}} \Delta c,$$

where $c$ = concentration and $(dn/dc)_{\bar{c}}$ = refractive increment for the solution at average concentration $\bar{c}$, $$l_{cell}(c_2 - c_1)(dn/dc)_{cell}$$
$$= \Delta D (c_1 - c_3)(dn/dc)_{compensator}.$$

If:

$$(dn/dc)_{cell} = (dn/dc)_{comp}.$$

then:

$$l_{cell}(c_2 - c_1) = \Delta D (c_1 - c_3)$$

or:

$$l_{cell} \Delta c_{cell} = \Delta D (\Delta c_{comp}.)$$

Then:

$$\Delta c_{cell} = (\Delta D/l_{cell})(\Delta c_{comp}.)$$

or:

$$\Delta c_{cell} = (\Delta c_{comp}./l_{cell}) \Delta D$$

The compensator, then is direct reading in $\Delta c_{cell}$.

Although it is possible to utilize the movable compensator element of the design described above or equivalents thereof in either the reference or the unknown limb of the interferometer it is preferred to utilize the movable element in the reference limb. In this way a parallel path change mode is effected. That is, if the refractometric path is lengthened, the compensator path in the opposite limb should be lengthened rather than shortening the compensator path in the same limb as the refractometric path lengthening. This follows from the fact that glass and solution are less disparate in refractive dispersion than are air and solution and obeys the optical principle that in interferometers which are required to show fringes in white light, the interfering waves should be arranged to have as far as possible equal paths in media of identical dispersion.

I claim:

1. In a white light interferometer comprising a test limb containing an unknown material in the light path thereof and a reference limb containing a reference material in the light path thereof, a compartmented compensator which comprises means for varying the ratio of the length of light path through a first compartment of the compensator to the length of light path through a second compartment of the compensator in said test limb with respect to the ratio of the length of light path through a first compartment of the compensator to the length of light path through a second compartment of the compensator in said reference limb, each of said first and second compartments in both limbs containing fluid media having refractive dispersions which are substantially identical to those of said reference material and said unknown material, the fluid medium in said first compartment in both limbs having a refractive index which is different from that of the fluid medium in said second compartment in both limbs.

2. A compensator according to claim 1 wherein the refractive index of the fluid medium in said first compartment in both limbs is the same as that of said reference material.

3. A compensator according to claim 1 wherein the refractive index of the fluid medium in said first compartment in both limbs is the same as that of said unknown material.

4. A compensator according to claim 1 wherein the refractive index of the fluid medium in said first compartment in both limbs is within the range between that of said reference material and that of said unknown material.

5. A compensator according to claim 1 wherein the length of light path through the first and second compartments in said reference limb is variable, an increase in the length of light path through said first compartment resulting in an equal decrease in the length of light path through said second compartment, the length of light path through each of the first and second compartments in said test limb being fixed, the total length of light path through the first and second compartments in said reference limb being equal to the total length of light path through the first and second compartments in said test limb.

* * * * *